US006710506B2

(12) United States Patent
Ishizuka et al.

(10) Patent No.: US 6,710,506 B2
(45) Date of Patent: Mar. 23, 2004

(54) AC GENERATOR

(75) Inventors: Atsuo Ishizuka, Nagoya (JP); Masao Ichikawa, Nukata-gun (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 10/340,616

(22) Filed: Jan. 13, 2003

(65) Prior Publication Data

US 2003/0137214 A1 Jul. 24, 2003

(30) Foreign Application Priority Data

Jan. 18, 2002 (JP) ........................................ 2002-009931

(51) Int. Cl.$^7$ .............................................. H02K 1/22
(52) U.S. Cl. ........................................ 310/263; 310/51
(58) Field of Search ........................... 310/263, 51, 42; 29/596–598

(56) References Cited

U.S. PATENT DOCUMENTS

| | | | |
|---|---|---|---|
| 3,714,484 A | * | 1/1973 | Habert ........................ 310/263 |
| 4,201,930 A | | 5/1980 | Inagaki et al. |
| 4,972,114 A | * | 11/1990 | Frister ........................ 310/263 |
| 5,270,605 A | * | 12/1993 | Lefrancois et al. ......... 310/263 |
| 5,708,318 A | * | 1/1998 | Fudono ....................... 310/263 |
| 6,433,455 B1 | * | 8/2002 | Kometani et al. .......... 310/263 |

FOREIGN PATENT DOCUMENTS

| JP | B2 6-48897 | 6/1994 |
|---|---|---|
| JP | B2 3223536 | 8/2001 |

* cited by examiner

*Primary Examiner*—Tran Nguyen
(74) *Attorney, Agent, or Firm*—Oliff & Berridge, PLC

(57) ABSTRACT

An ac generator includes a stator having a stator core with a plurality of slots and a stator winding disposed in the slots and a rotor having trapezoidal claw-shaped pole pieces that alternately extend in opposite directions to interleave each other. In such an ac generator, each pole piece has a chamfered surface at the tip. The chamfered surface increases a distance from the inside surface of the stator core as the chamfered surface becomes away from the circumferential center of the pole pieces. The chamfered surface has narrower area at the front half in the rotation direction than the rear half.

7 Claims, 4 Drawing Sheets

AC GENERATOR

CROSS REFERENCE TO RELATED APPLICATION

The present application is based on and claims priority from Japanese Patent Application 2002-9931, filed Jan. 18, 2002, the contents of which are incorporated herein by reference.

BACKGROUND OF THE INVENTION

1. Field of the Invention

The present invention relates to an ac generator that has a rotor having a plurality of claw-shaped pole pieces and a field coil held inside the pole pieces.

2. Description of the Related Art

It has been found that the magnetic noise of an ac generator is caused by the third harmonic wave of magnetic flux that is distorted during operation. In order to reshape the waveform of the magnetic flux into a sine wave, JP-B2-61-11066 proposes an ac generator in which a rotor has scalene trapezoidal claw-shaped pole pieces. That is, the surface of the pole pieces has a trapezoidal shape that is asymmetrical with respect to the center line of the pole piece that is perpendicular to the rotation direction of the rotor.

JP-B2-3223536 proposes a rotor having claw-shaped pole pieces each of which has a chamfered front surface that is formed at the front of the pole pieces in the rotation direction thereof and a chamfered rear surface that is formed at the rear of the pole pieces in the rotation direction and is larger than the chamfered front surface.

However, it is difficult to form the claw-shaped pole pieces disclosed in JP-B2-61-11066 by forging because they are asymmetrical with respect to the center line, which makes it difficult to evenly apply forging pressure on the entire surface of the pole pieces. As a result, the rotor can not have the pole pieces having an accurate uniform shape.

On the other hand, the ac generator disclosed in JP-B2-3223536 has a problem of a magnetic noise caused by sharp change of magnetic flux between the pole pieces. Because the chamfered rear surface of one pole piece and the chamfered front surface of the next pole piece extend from opposite end of the rotor to face each other, the magnetic flux changes sharply when the rotor rotates, thereby causing magnetic noise. In addition, the output power may be reduced because the chamfered rear surface becomes too large for the pole pieces to conduct effective magnetic flux.

SUMMARY OF THE INVENTION

Therefore, an object of the invention is to provide a powerful and noiseless ac generator.

An ac generator according to a feature of the invention includes a rotor having trapezoidal claw-shaped pole pieces that alternately extend in opposite directions to interleave each other, in which each of the pole pieces has a chamfered surface at the tip thereof that faces the inside surface of the stator. The chamfered surface has narrower area at the front half of the pole piece in the rotation direction than the rear half. Because such an asymmetrical chamfered surface is formed at limited area after the pole pieces are forged, the pole pieces having accurate size and shape can be provided. When the rotor with such pole pieces and a field coil is rotated in a predetermined direction to generate power, the magnetic flux sharply increases at the front half of the chamfered surfaces of the pole pieces. On the other hand, the magnetic flux gradually decreases at the rear half of the chamfered surfaces. Therefore, a magnetic wave that is similar to the wave provided by the scalene trapezoidal pole pieces of a prior art ac generator is formed. Such a magnetic wave is opposite in phase to the third harmonic wave, so that the magnetic noise caused by the third harmonic wave is canceled. In addition, because the area of the chamfered surface is comparatively smaller than the prior art, reduction in the output power is negligibly small.

In an ac generator according to another feature of the invention, a rear half surface of each of the pole pieces in the rotation direction has a concavity or a through hole at the tip portion thereof facing the inside surface of the stator core. The concavity or the through hole provides an asymmetrical chamfered surface at a limited area of the pole piece. Because the concavity or the through hole can be easily formed when or after the pole pieces are forged, the pole pieces having accurate size and shape can be provided. This feature brings about substantially the same effects as the above-described ac generator.

In the ac generator described above, each of the pole pieces may have a front chamfered surface and a rear chamfered surface that are approximately symmetrical at the opposite corners thereof. Therefore, there is little change in magnetic flux between the pole pieces. As a result, the magnetic noise caused by change in the magnetic flux is very low.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Various embodiments of the invention will be described below with reference to the appended drawings.

A vehicle ac generator 1 according to the first embodiment will be described with reference to FIGS. 1–6.

Figure 3:
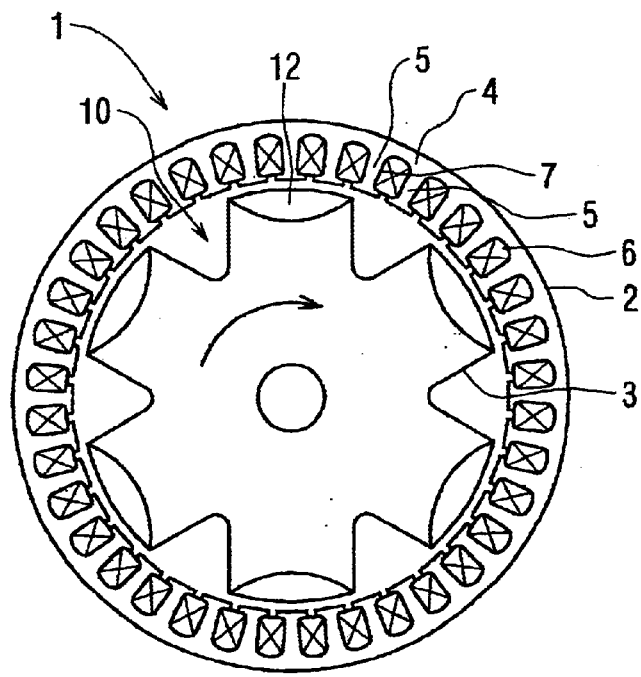
FIG. 3 is a cross-sectional front view of the ac generator according to the first embodiment.
Figure 4:
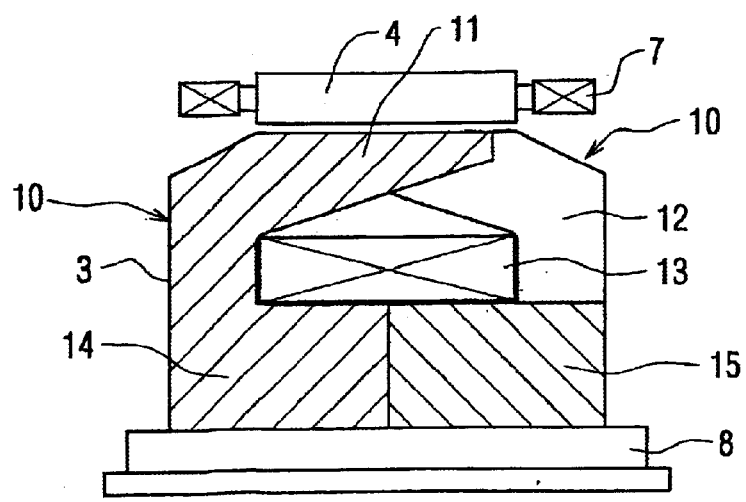
FIG. 4 is a cross-sectional side view of a main portion of the ac generator according to the first embodiment.

The ac generator 1 is comprised of a stator 2 and a rotor 3. The stator 2 is comprised of a ring-shaped stator core 4 that is formed of laminated sheets of flat rolled silicon steel and a stator winding 6. The stator core 4 has a plurality of teeth 5 and slots 7 at the inner surface thereof to have the stator winding 6, as shown in FIG. 3.

The rotor 3 is comprised of a rotary shaft 8, a pair of pole cores 10 and a cylindrically wound field coil 13. Each pole core 10 has a plurality of claw-shaped pole pieces 11, 12, center boss cores 14, 15 and a center through hole. The pole cores 10 are formed by forging. The pair of pole cores 10 is fixed by the rotary shaft 8 fitted into the center through hole so that the claw-shaped pole pieces 11 and 12 respectively extend from opposite ends of the rotor 3 to interleave each other. The field coil 13 is inserted inside the claw-shaped poles around the center boss cores 14, 15, from outside. When field current is supplied to the field coil 13, the pole pieces 11 are polarized to be N and the pole pieces 12 are polarized to be S.

Figure 1:
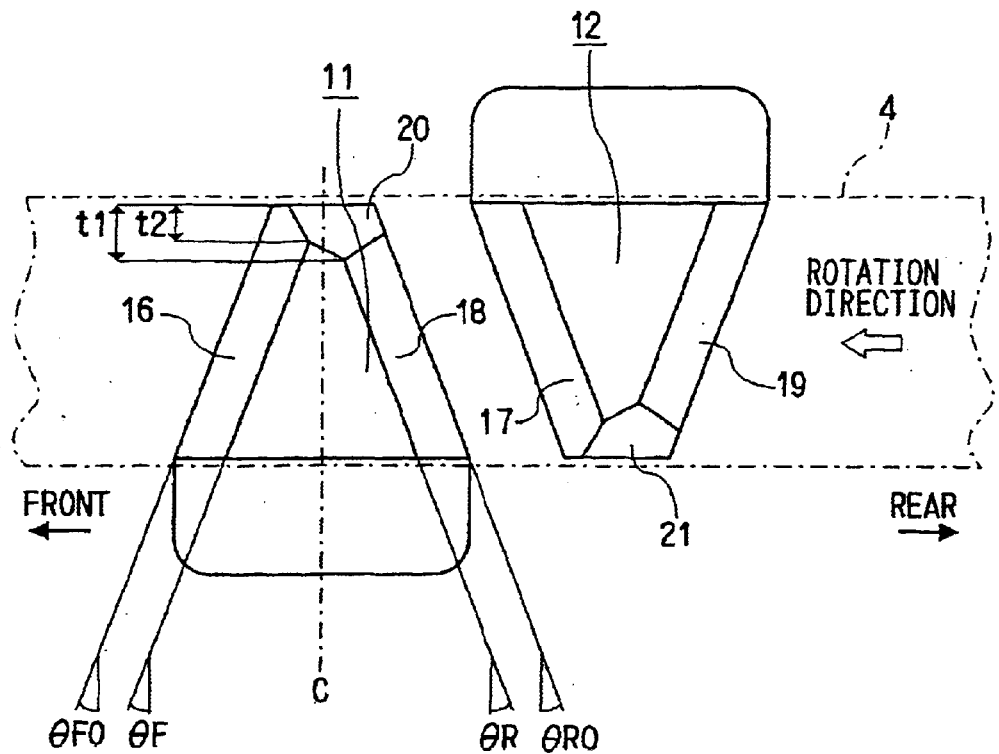
FIG. 1 is a plan view illustrating a pair of claw-shaped pole pieces of a rotor of an ac generator according to the first embodiment of the invention.
Figure 2:
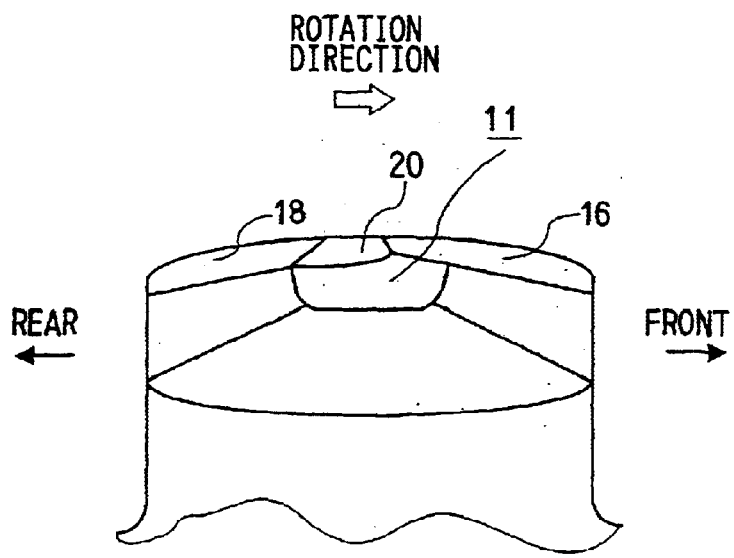
FIG. 2 is a front view of the pole piece shown in FIG. 1.

Each of the claw-shaped pole pieces 11, 12 has a trapezoidal shape having symmetrically skewed front and rear sides that are located at the front and rear sides of the pole piece surface in the rotation direction. The front side is skewed at an angle $\theta f0$, and the rear side is skewed at an angle $\theta r0$ with respect to the center line c of the pole piece surface, as shown in FIG. 1. The skewed angle is determined according to a slot pitch and a thickness of the stator core. That is, $\theta f0=\theta r0=\tan^{-1}(\tau s/L)$, where $\tau s$ is a slot pitch, L is a thickness of the stator core. After the skewed sides are formed by forging, a chamfered front surface 16 is formed at the front corner of the pole piece surface of the pole piece 11 in the rotation direction, and a chamfered front surface 17 is formed at the front corner of the pole piece surface of the pole piece 12 in the rotation direction. In the same manner, a chamfered rear surface 18 is also formed at the rear corner of the pole piece surface of the pole piece 11 in the rotation direction, and a chamfered rear surface 19 is formed at the rear corner of the pole piece surface of the pole piece 12 in the rotation direction. The distance between the inner surface of the stator 2 and the chamfered surfaces 16, 17, 18 and 19 gradually increases as the chamfered surfaces become away from the center line c of the pole piece that is perpendicular to the rotation direction. Tip chamfered surfaces 20, 21 are also formed at the tip of the pole pieces 11, 12 so that the front ridge line of the chamfered front surfaces 16, 17 and the front ridge line of the chamfered tip surfaces 20, 21 cross at a position that is a distance t2 inside from the tip of the pole pieces 11, 12 and so that the rear ridge line of the chamfered rear surfaces 18, 19 and the rear ridge line of the chamfered tip surfaces 20, 21 cross at a position that is a distance t1 more inside from the tip of the pole pieces 11, 12. That is, t1>t2. In other words, the front half of the chamfered tip surfaces 20, 21 with regard to the center line c thereof has a narrower area than the rear half thereof. For example, the ratio of the area between the front half and the rear half is 1:2. The chamfered front surfaces 16, 17, chamfered rear surfaces 18, 19 and the chamfered tip surfaces 20, 21 are formed by machining or sizing. Therefore, the pole pieces that have accurate sizes and a uniform shape can be easily provided.

When field current is supplied to the field coil 13, all the pole pieces 11 are polarized to S poles, and all the pole pieces 12 are polarized to N poles. When the rotor 3 is rotated in a predetermined direction to generate power, the magnetic flux sharply increases at the front half of the tip chamfered surfaces 20, 21 of the pole pieces 11, 12. On the other hand, the magnetic flux gradually decreases at the rear half of the tip chamfered surfaces 20, 21. Therefore, a magnetic wave that is similar to the wave provided by the scalene trapezoidal pole pieces of a prior art ac generator is formed. Such a magnetic wave is opposite in phase to the third harmonic wave, so that the magnetic noise caused by the third harmonic wave is canceled.

Because the area of the chamfered surface of the ac generator according to the first embodiment of the invention is comparatively smaller than the chamfered surface of the prior art, reduction in the output power is negligibly small. Because the front and rear chamfered surfaces are the same in shape, there is little change in magnetic flux between the pole pieces. Therefore, the magnetic noise caused by change in the magnetic flux is very low.

Figure 5:
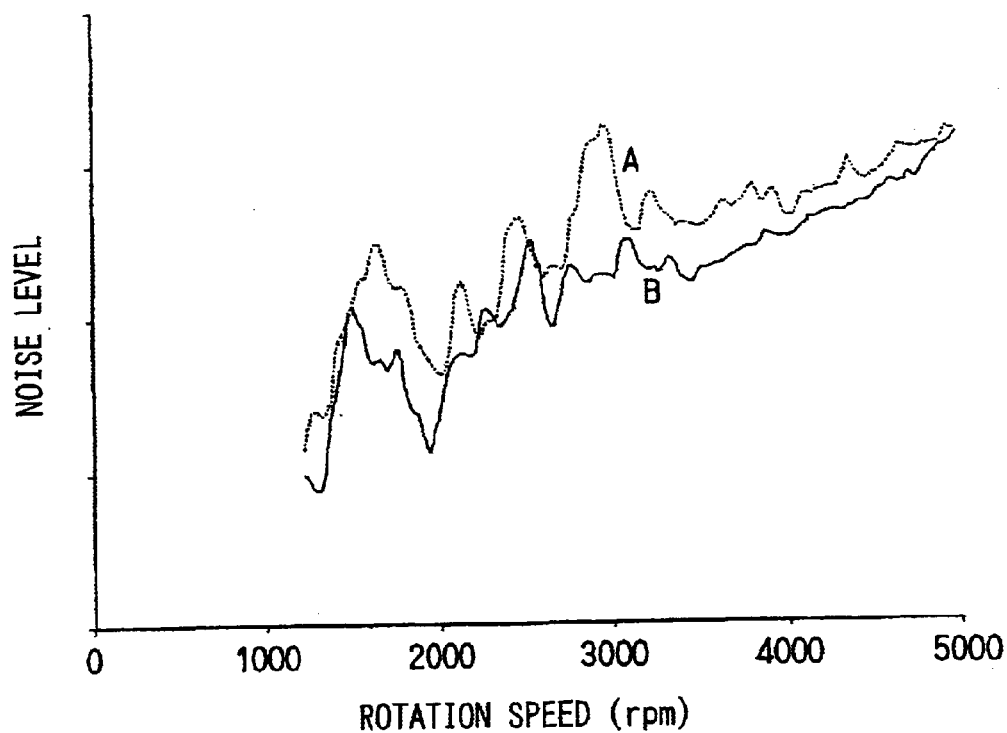
FIG. 5 is a graph comparing noise levels of two ac generators in operation.

As shown in FIG. 5, the ac generator according to the first embodiment of the invention, which is indicated by a solid line B, generate significantly lower noise than a prior art ac generator that has no such chamfered surfaces as the ac generator according to the invention, which is indicated by a dotted line A.

Figure 6:
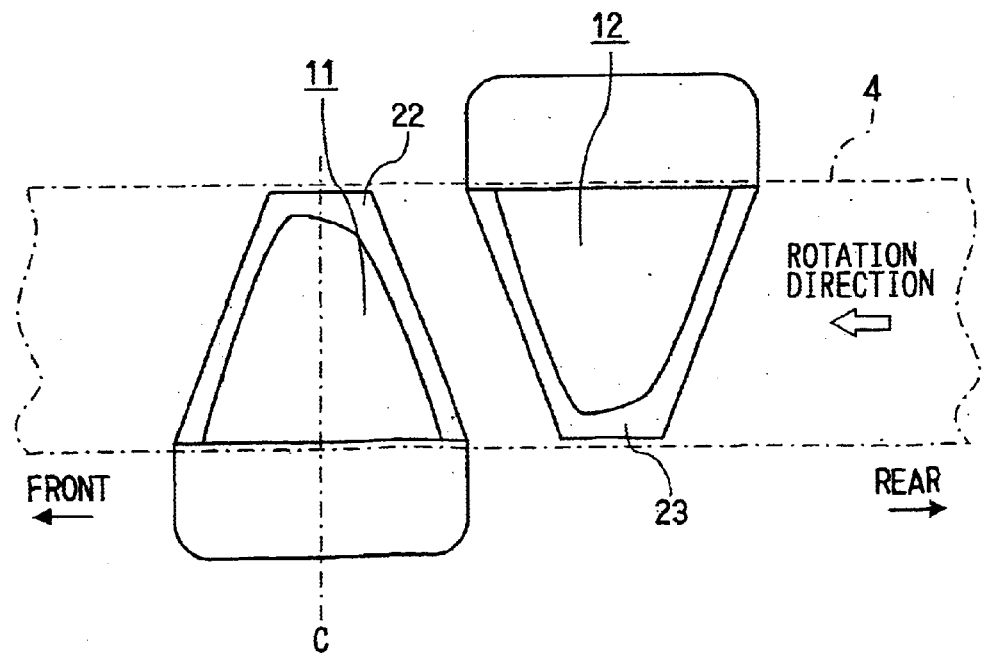
FIG. 6 is a plan view illustrating a pair of claw-shaped pole pieces of a rotor of an ac generator according to a variation of the first embodiment of the invention.

A variation of the ac generator according to the first embodiment is shown in FIG. 6.

Figure 7:
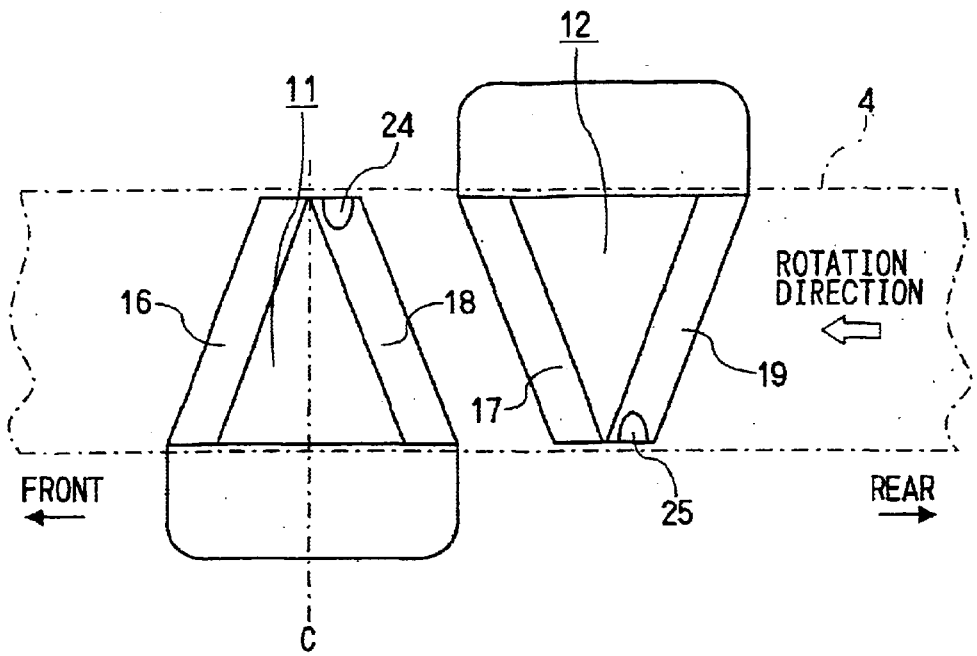
FIG. 7 is a plan view illustrating a pair of claw-shaped pole pieces of a rotor of an ac generator according to the second embodiment of the invention.

As shown in FIG. 6, the chamfered front surfaces 16, 17, the chamfered rear surfaces 18, 19 and the chamfered tip surfaces 20, 21 are continuously formed on the pole pieces 11, 12, so that chamfered surfaces 22, 23 encircled by a hyperbolically curved ridge are respectively formed on the pole pieces 11, 12 instead of chamfered surfaces 16–21 that are encircled by the ridge of a scalene trapezoidal shape. Therefore, the front half of the chamfered surfaces 22, 23 with regard to the center line c thereof in the rotation direction has a narrower area than the rear half thereof An ac generator according to the second embodiment of the invention is described with reference to FIG. 7. Incidentally, the same reference numeral indicates the same or substantially the same member, part or portion as the first embodiment, hereafter.

Instead of the tip chamfered surfaces 20, 21, concavities 24, 25 are respectively formed at the rear half tip portion of the pole pieces 11, 12 in the rotation direction. When the rotor 3 is rotated in a predetermined direction to generate power, the magnetic flux sharply increases at the front half of the tip portion of the chamfered surfaces 16, 17 of the pole pieces 11, 12. On the other hand, the magnetic flux gradually decreases at the rear half. Therefore, a magnetic wave that is similar to the wave provided by the scalene trapezoidal pole pieces of a prior art ac generator is formed, so that the magnetic noise caused by the third harmonic wave is canceled. Because the area of the concavities 24, 25 is comparatively smaller than the prior art, reduction in the output power is negligibly small. Because the front and rear chamfered surfaces are the same in shape, there is little change in magnetic flux between the pole pieces. Therefore, the magnetic noise caused by change in the magnetic flux is very low.

The concavities 24, 25 are formed when the pole cores 10 are forged. However, the concavities 24, 25 can be formed by machining or the like after the pole cores 10 are forged. The shape of the concavities 24, 25 can be parabolic, rectangular, V-shaped. The number of the concavity in a pole piece can be two or more.

Figure 8:
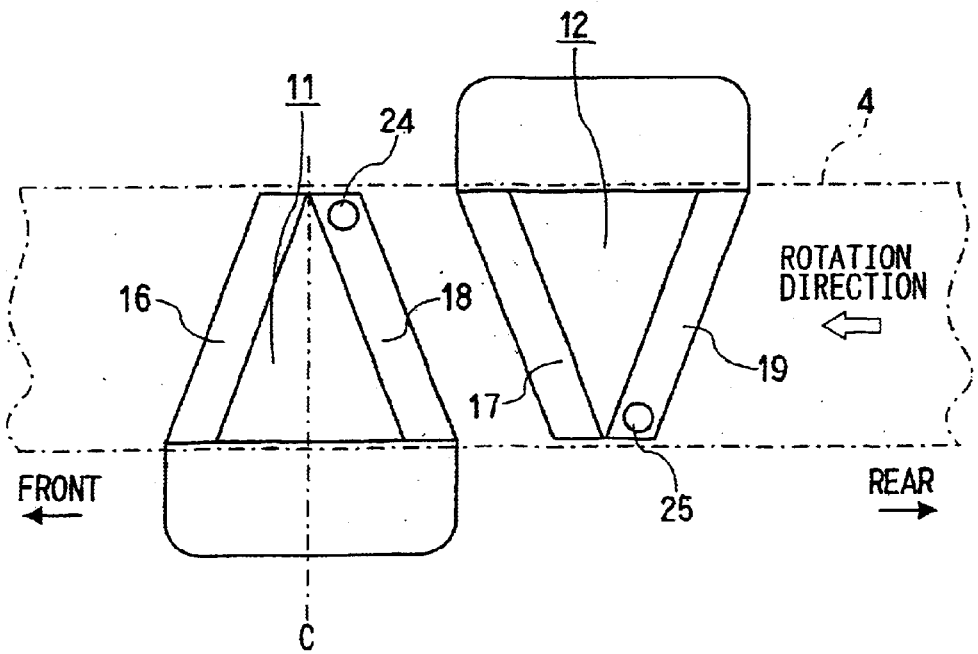
FIG. 8 is a plan view illustrating a pair of claw-shaped pole pieces of a rotor of an ac generator according to the third embodiment of the invention.

An ac generator according to the third embodiment of the invention is described with reference to FIG. 8.

Instead of the concavities 24, 25, circular through holes 26, 27 are respectively formed at the rear half tip portion of the pole pieces 11, 12 in the rotation direction. The through holes 26, 27 are formed when the pole cores 10 are forged. However, the through holes 26, 27 can be formed by machining or the like after the pole cores 10 are forged. The shape of the concavities 26, 27 can be triangular, rectangular or the like. The number of the through holes per each pole piece can be two or more.

The operation and the effect of the ac generator according to the third embodiment is substantially the same as the above described ac generators.

The above-described ac generators can be used in various fields other than the vehicle. The pole pieces according to the invention can be mounted in the stator instead of the rotor.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An alternating current generator including a stator having a stator core with a plurality of slots formed at inside surface of said stator core and a stator winding disposed in the slots and a rotor disposed opposite said stator and having trapezoidal claw-shaped pole pieces that alternately extend in opposite directions to interleave each other, wherein:

each of said pole pieces has substantially symmetric front and rear chamfered surfaces at opposite corners thereof and a tip chamfered surface at the tip thereof between said front and rear chamfered surfaces, said chamfered surfaces facing the inside surface of said stator core;

said tip chamfered surface increases a distance from the inside surface of said stator core as said tip chamfered surface becomes away from the circumferential center of said pole pieces; and said tip chamfered surface has narrower area at a front half thereof in the rotation direction than the rear half thereof.

2. An alternating current generator including a stator having a stator core with a plurality of slots formed at inside surface of said stator core and a stator winding disposed in the slots and a rotor disposed opposite said stator and having trapezoidal claw-shaped pole pieces that alternately extend in opposite directions to interleave each other, wherein each of said pole pieces has substantially symmetric front and rear chamfered surfaces at opposite corners thereof;

a rear half surface of each of said pole pieces in the rotation direction has a concavity at the tip portion thereof facing the inside surface of said stator core.

3. An alternating current generator including a stator having a stator core with a plurality of slots formed at inside surface of said stator core and a stator winding disposed in the slots and a rotor disposed opposite said stator and having trapezoidal claw-shaped pole pieces that alternately extend in opposite directions to interleave each other, wherein each of said pole pieces has substantially symmetric front and rear chamfered surfaces at opposite corners thereof;

a rear half surface of each of said pole pieces in the rotation direction has a through hole at the tip portion thereof facing the inside surface of said stator core.

4. An alternating current generator including a stator having a stator core with a plurality of slots formed at inside surface of said stator core and a stator winding disposed in the slots and a rotor disposed opposite said stator and having trapezoidal claw-shaped pole pieces that alternately extend in opposite directions to interleave each other, wherein:

each of said pole pieces has approximately symmetric front and rear chamfered surfaces and a magnetic flux control surface at the tip thereof between said front and rear chamfered surfaces, said chamfered surfaces and flux control surface facing the inside surface of said stator core;

said magnetic flux control surface increases a distance from the inside surface of said stator core as said surface becomes away from the circumferential center of said pole pieces; and said magnetic flux control surface has narrower area at a front half thereof in the rotation direction than the rear half thereof.

5. The alternating current generator as claimed in claim 4, wherein said magnetic flux control surface comprises a chamfered surface.

6. The alternating current generator as claimed in claim 4, wherein said magnetic flux control surface has a concavity.

7. The alternating current generator as claimed in claim 4, wherein said magnetic flux control surface has a through hole.

\* \* \* \* \*